(12) United States Patent
Kiriyama et al.

(10) Patent No.: US 10,786,096 B2
(45) Date of Patent: Sep. 29, 2020

(54) PHOTO STAND SHEET, PHOTO STAND, AND PRINTER

(71) Applicant: FUJI XEROX CO., LTD., Tokyo (JP)

(72) Inventors: Ryohei Kiriyama, Kanagawa (JP);
Toshiyasu Yukawa, Kanagawa (JP);
Kojiro Tsutsumi, Kanagawa (JP);
Katsumi Harada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/164,817

(22) Filed: Oct. 19, 2018

(65) Prior Publication Data
US 2019/0320824 A1    Oct. 24, 2019

(30) Foreign Application Priority Data

Apr. 20, 2018    (JP) .................. 2018-081020

(51) Int. Cl.
| | | |
|---|---|---|
| *A47G 1/14* | (2006.01) | |
| *G03G 15/00* | (2006.01) | |
| *B32B 7/12* | (2006.01) | |
| *B32B 3/26* | (2006.01) | |
| *A47G 1/06* | (2006.01) | |

(52) U.S. Cl.
CPC ........... *A47G 1/141* (2013.01); *A47G 1/0633* (2013.01); *B32B 3/263* (2013.01); *B32B 7/12* (2013.01); *G03G 15/6523* (2013.01); *A47G 2001/0694* (2013.01)

(58) Field of Classification Search
CPC .............. A47G 1/141; A47G 1/0633; A47G 2001/0694
See application file for complete search history.

(56) References Cited

U.S. PATENT DOCUMENTS

| | | | | |
|---|---|---|---|---|
| 1,143,729 A | * | 6/1915 | Schmidt ............... | B65D 5/4233 40/312 |
| 2,252,571 A | * | 8/1941 | Kohn ..................... | A47G 1/141 248/459 |
| 2,292,744 A | * | 8/1942 | Cross .................... | A47G 1/141 40/754 |
| 2,428,772 A | * | 10/1947 | Aranoff ................. | A47G 1/141 40/789 |
| 4,450,638 A | * | 5/1984 | Bader .................... | A47G 1/141 40/754 |

(Continued)

FOREIGN PATENT DOCUMENTS

| | | |
|---|---|---|
| JP | H08317843 | 12/1996 |
| JP | H10243856 | 9/1998 |
| JP | 2006055215 | 3/2006 |

*Primary Examiner* — Gary C Hoge
(74) *Attorney, Agent, or Firm* — JCIPRNET

(57) ABSTRACT

In a photo stand sheet, the length of the photo stand sheet in a first direction is smaller than that in a second direction perpendicular to the first direction. The photo stand sheet includes: a frame part having a window part, the frame part having a rectangular shape in which the length in the first direction is larger than that in the second direction; a stand part that is formed so as to be continuous with the frame part and that stands on a ground after the photo stand sheet is formed into a final shape; and a photo part that is formed so as to be continuous with the stand part, the dimension thereof in the second direction being larger than the dimension of the frame part in the second direction.

16 Claims, 19 Drawing Sheets

(56) References Cited

U.S. PATENT DOCUMENTS

| | | | | |
|---|---|---|---|---|
| 4,622,769 | A | * | 11/1986 | Friedman .................. G09F 1/14 40/750 |
| 4,750,283 | A | * | 6/1988 | Halpern ................. A47G 1/141 248/459 |
| 4,780,975 | A | * | 11/1988 | Friedman ............... A47G 1/141 229/92.8 |
| 5,337,949 | A | * | 8/1994 | Seeley ................... A47G 1/141 229/84 |
| 5,592,768 | A | * | 1/1997 | Testa ..................... A47G 1/141 40/539 |
| 5,950,341 | A | * | 9/1999 | Cross ..................... A47G 1/141 40/750 |
| 2001/0016996 | A1 | * | 8/2001 | Olson ................... A47G 1/141 40/789 |
| 2001/0047606 | A1 | * | 12/2001 | Cinquina ............... A47G 1/141 40/774 |
| 2003/0051384 | A1 | * | 3/2003 | Miska .................. A47G 1/0633 40/789 |
| 2003/0056415 | A1 | * | 3/2003 | Janetzke ............... A47G 1/141 40/789 |
| 2003/0200691 | A1 | * | 10/2003 | Tsao ....................... A47G 1/141 40/789 |
| 2009/0207112 | A1 | * | 8/2009 | Heine .................. A47G 1/0616 345/87 |
| 2015/0202908 | A1 | * | 7/2015 | Bundy .................. B42D 15/08 40/725 |
| 2015/0371562 | A1 | * | 12/2015 | Feigenbaum ............ G09F 1/06 40/124.14 |
| 2016/0143461 | A1 | * | 5/2016 | Millman ............... A47G 1/0633 40/786 |
| 2017/0000269 | A1 | * | 1/2017 | Mouyal ................ A47G 1/0633 |

* cited by examiner

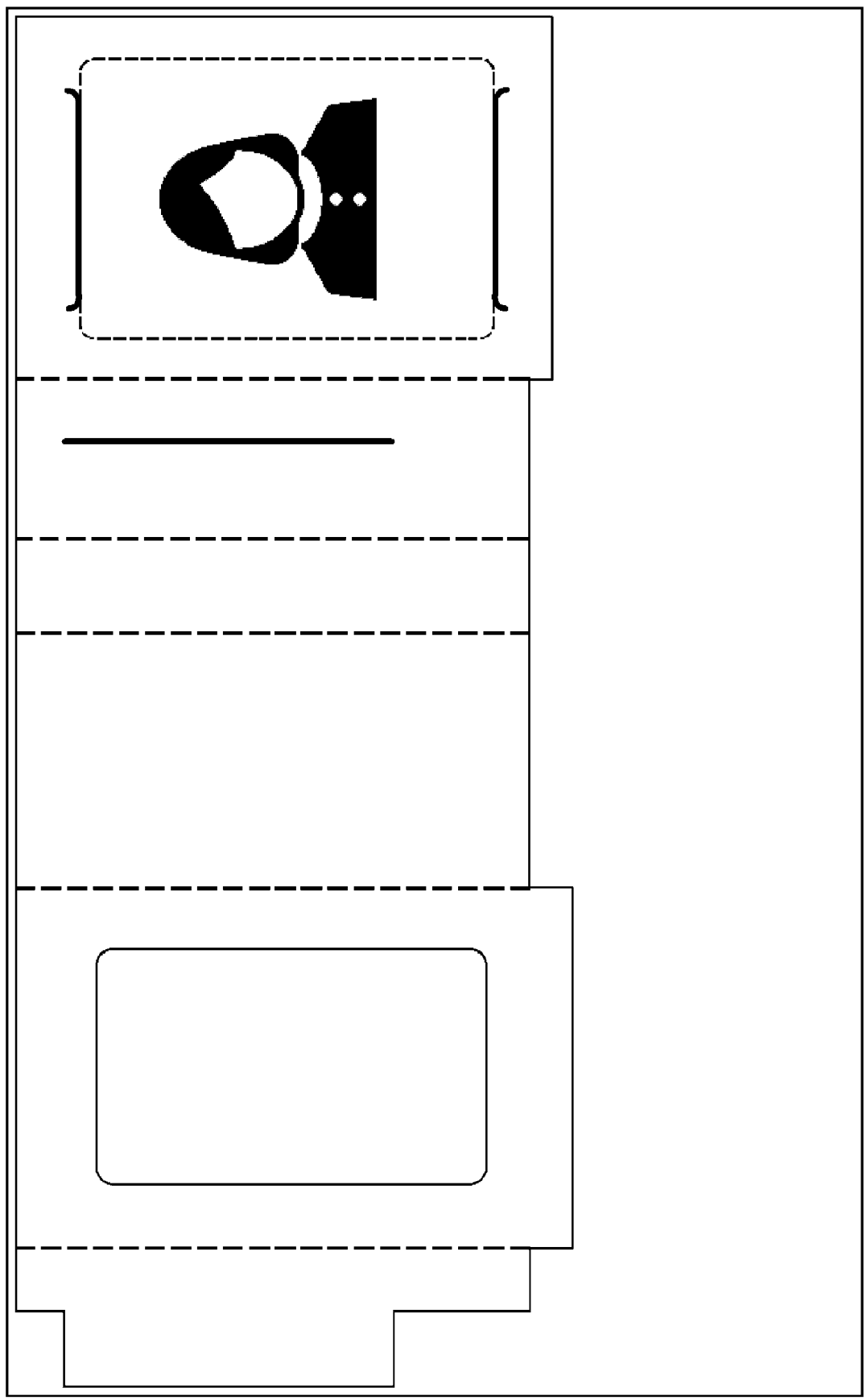

PHOTO STAND SHEET, PHOTO STAND, AND PRINTER

CROSS-REFERENCE TO RELATED APPLICATIONS

This application is based on and claims priority under 35 USC 119 from Japanese Patent Application No. 2018-081020 filed Apr. 20, 2018.

BACKGROUND

(i) Technical Field

The present disclosure relates to a photo stand sheet, a photo stand, and a printer.

(ii) Related Art

Japanese Unexamined Patent Application Publication No. 8-317843 discloses a stereoscopic photo stand including a front plate having a window hole through which a photo is viewed, left and right side-surface plates extending backward from the left and right sides of the front plate, and engaging means provided at the rear ends of the left and right side-surface plates. By engaging the left and right ends of a flat photo with the engaging means, the photo is held in a convex-curved shape. The distance between the left and right engaging means is smaller than the horizontal length of the photo. The front plate, the left and right side-surface plates, and the left and right engaging means are formed integrally.

Japanese Unexamined Patent Application Publication No. 2006-55215 discloses a printable frame that is composed of a single printer sheet including, on the front side thereof: a rectangular printing area in which a printer can print an image, such as a photo or a picture; and flaps provided on four edges of the print area so as to be continuous therewith. Each flap has at least three folding lines that are parallel to the edge of the print area continuous with the flap. By folding the sheet along the folding lines, hollow frame parts are formed. The frame parts have engaging parts engageable with adjoining frame parts in a folded state. By engaging the engaging parts together, the frame parts are fixed. The frame parts surround the print area.

SUMMARY

Aspects of non-limiting embodiments of the present disclosure relate to a photo stand sheet and a photo stand that allow the entirety of a photo to be stereoscopically viewed, that improve the appearance of the photo, and that can be easily formed, compared with a configuration in which an adhesive member is used in assembly.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a photo stand sheet, the length of the photo stand sheet in a first direction being smaller than that in a second direction perpendicular to the first direction.
The photo stand sheet includes: a frame part having a window part, the frame part having a rectangular shape in which the length in the first direction is larger than that in the second direction; a stand part that is formed so as to be continuous with the frame part and that stands on a ground after the photo stand sheet is formed into a final shape; and a photo part that is formed so as to be continuous with the stand part, a dimension thereof in the second direction being larger than a dimension of the frame part in the second direction.

BRIEF DESCRIPTION OF THE DRAWINGS

Exemplary embodiment of the present disclosure will be described in detail based on the following figures, wherein:

FIG. 19 shows a layout of captured image data on the photo stand sheet.

DETAILED DESCRIPTION

Figure 1:
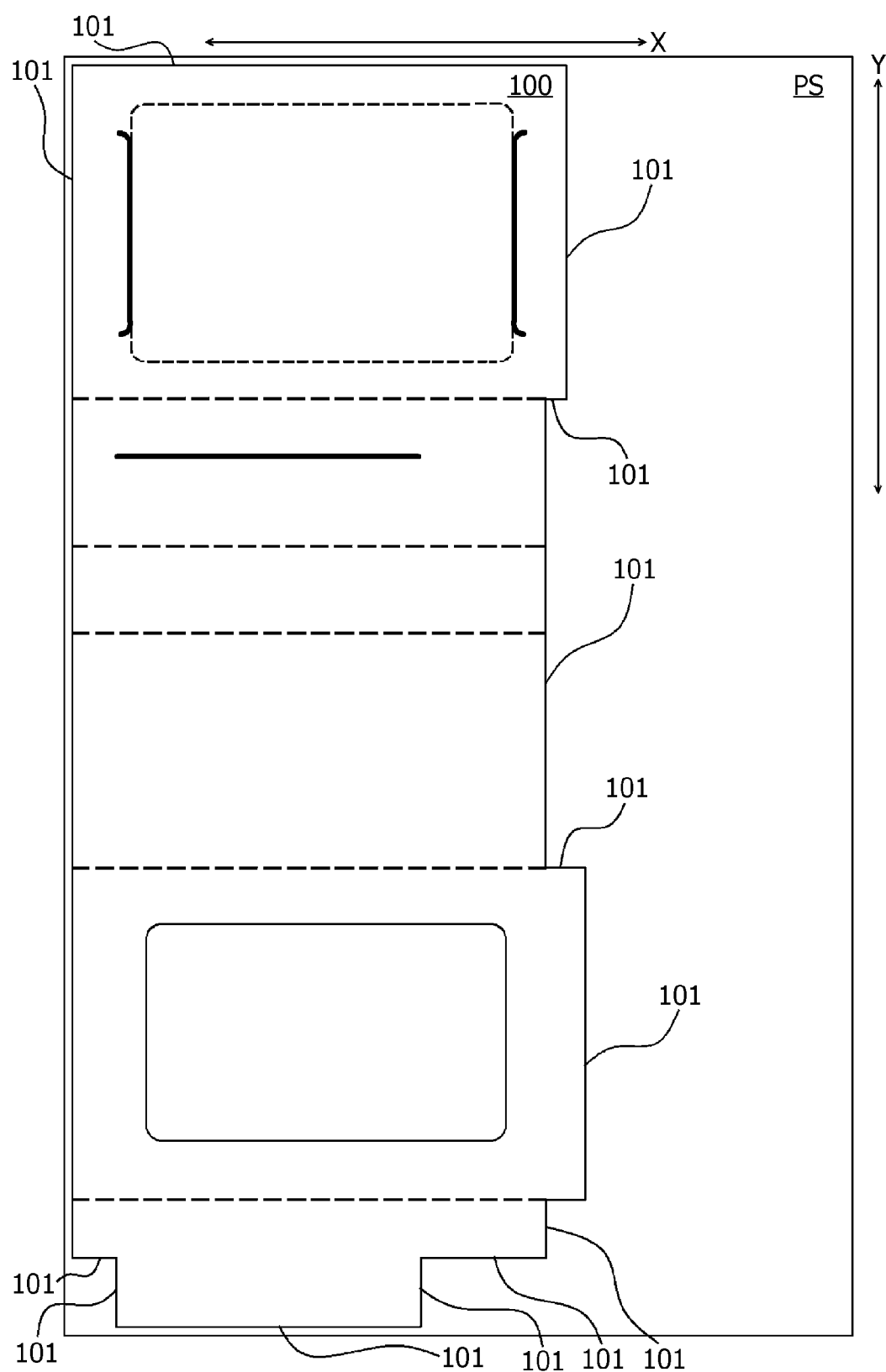
FIG. 1 shows the configuration of a photo stand sheet according to an exemplary embodiment.

Next, referring to the drawings, the present disclosure will be described in more detail by way of exemplary embodiments and examples. However, the present disclosure is not limited to these exemplary embodiments and examples.

Note that the drawings below are schematic, and the ratios of the dimensions are different from those in reality. For ease of understanding, illustration of components other than those needed for explanation is omitted where appropriate.

(1) Configuration of Photo Stand Sheet

Figure 2:
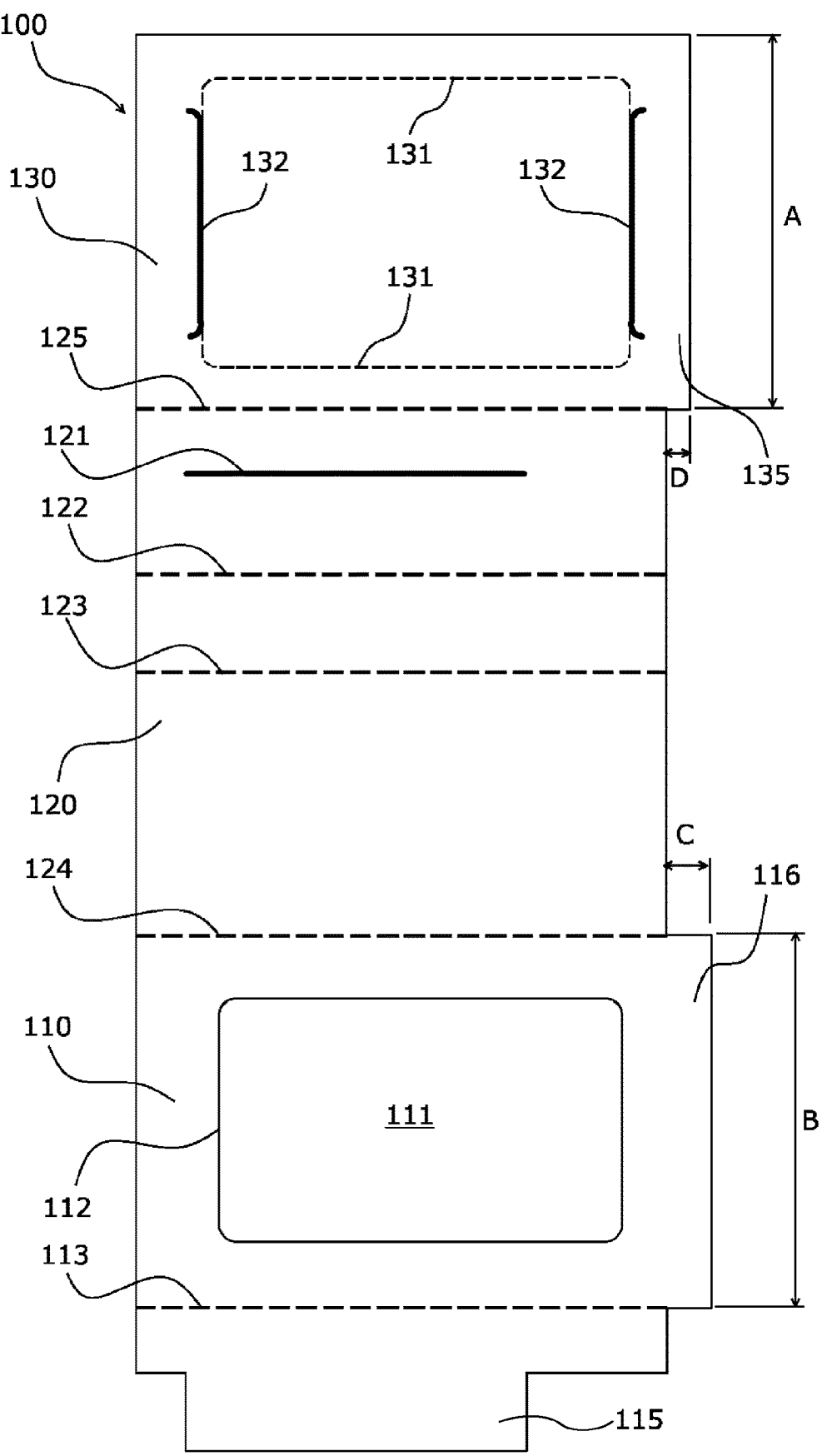
FIG. 2 shows a photo stand sheet body separated from the photo stand sheet.
Figure 3:
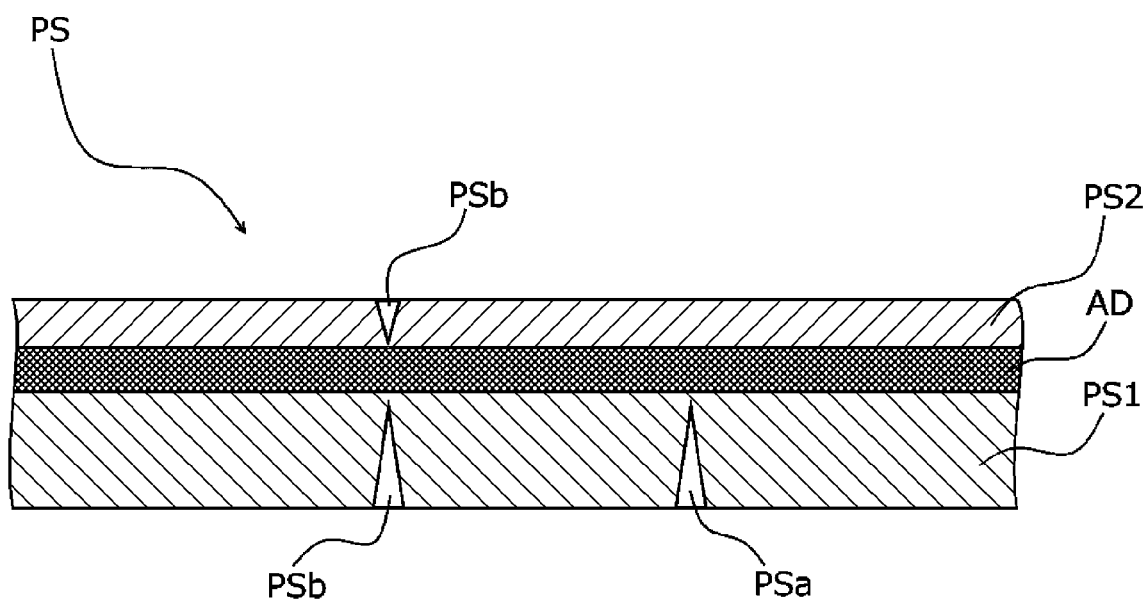
FIG. 3 is a schematic sectional view showing the layer configuration in the thickness direction of the photo stand sheet.

FIG. 1 shows the configuration of a photo stand sheet PS, FIG. 2 shows a photo stand sheet body 100 separated from the photo stand sheet PS, and FIG. 3 is a schematic sectional view showing the layer configuration of the photo stand sheet PS in the thickness direction.

Referring to the drawings, the configuration of the photo stand sheet PS will be described.

Referring to FIG. 1, the photo stand sheet PS has a size of A3 (width: 297 mm×length: 420 mm), which is a size of sheets on which the printer 1 can print images. The rectangular photo stand sheet body 100 has a first direction (X direction) intersecting a sheet transport direction of the printer 1, and a second direction (Y direction) perpendicular to the first direction. The length of the photo stand sheet body 100 in the second direction is longer than that in the first direction. The photo stand sheet body 100 can be separated from the photo stand sheet PS at slits 101 (described below).

As shown in FIG. 2, the photo stand sheet body 100 includes a frame part 110, a stand part 120, and a photo part 130.

The frame part 110 has a window part 111 and has a rectangular shape that is longer in the first direction. By removing the window part 111 along a slit 112 (described below), a photo printed at the photo part 130 can be viewed.

The stand part 120 is formed so as to be continuous with the frame part 110. When the photo stand sheet body 100 is formed into a photo stand, the stand part 120 stands on a ground FL, as will be described below.

The dimension A of the photo part 130 in the second direction is larger than the dimension B of the frame part 110 in the second direction. More specifically, as shown in FIG. 2, when the dimension of the photo part 130 in the second direction is A, and the dimension of the frame part 110 in the second direction is B, the following relationship is satisfied:

$$1.0 < A/B < 1.2.$$

As a result, when the photo stand sheet body 100 is formed into a photo stand, the photo part 130 is curved in a concave shape with respect to the window part 111, allowing a viewer to view the photo stereoscopically and improving the appearance of the photo. As A/B increases beyond 1.0, the curvature of the concave curve of the photo part 130 increases.

FIG. 3 shows the layer configuration of the photo stand sheet PS in the thickness direction. The photo stand sheet PS is a thick sheet including a back sheet PS1, a front sheet PS2, and an adhesive layer AD therebetween.

The back sheet PS1 is a thick sheet having a weight of 150 to 250 gsm and having a high degree of whiteness. A color printing sheet used in a normal color image forming apparatus can be suitably used as the back sheet PS1. The front sheet PS2 is made of a white non-transparent polyester-based biaxially oriented film having a thickness of 30 to 40 μm. The front sheet PS2 is flexible and is suited to be punched.

As schematically shown in FIG. 3, the photo stand sheet PS is provided with a plurality of folding portions PSa by cutting halfway through the photo stand sheet PS from the rear side such that the photo stand sheet PS can be folded therealong and is provided with slits PSb by cutting halfway through the photo stand sheet PS from the front and rear sides such that the photo stand sheet PS can be cut therealong.

As shown in FIG. 1, the photo stand sheet body 100 is sectioned from the photo stand sheet PS by the slits 101 and can be separated from the photo stand sheet PS along the slits 101.

The frame part 110 of the photo stand sheet body 100 has the slit 112 defining the window part 111. The window part 111 is formed by removing a part of the photo stand sheet body 100 from the photo stand sheet body 100 along the slit 112.

As shown in FIG. 2, an insertion portion 115 is formed on the side of the frame part 110 opposite from the stand part 120 so as to be continuous with the frame part 110 via a first folding portion 113. The stand part 120 has, at a position closer to the photo part 130 than to the frame part 110, a slit 121 penetrating through the photo stand sheet body 100. The insertion portion 115, which is formed so as to be continuous with the frame part 110 and is peak-folded along the first folding portion 113, is inserted into the slit 121 provided in the stand part 120. Thus, the photo stand sheet body 100 is formed into a photo stand.

As shown in FIG. 2, the stand part 120 has a second folding portion 122 at a position closer to the photo part 130 than to the frame part 110, a third folding portion 123 substantially at the same distance from the frame part 110 and the photo part 130, a fourth folding portion 124 at the boundary between the stand part 120 and the frame part 110, and a fifth folding portion 125 at the boundary between the stand part 120 and the photo part 130.

Figure 5:
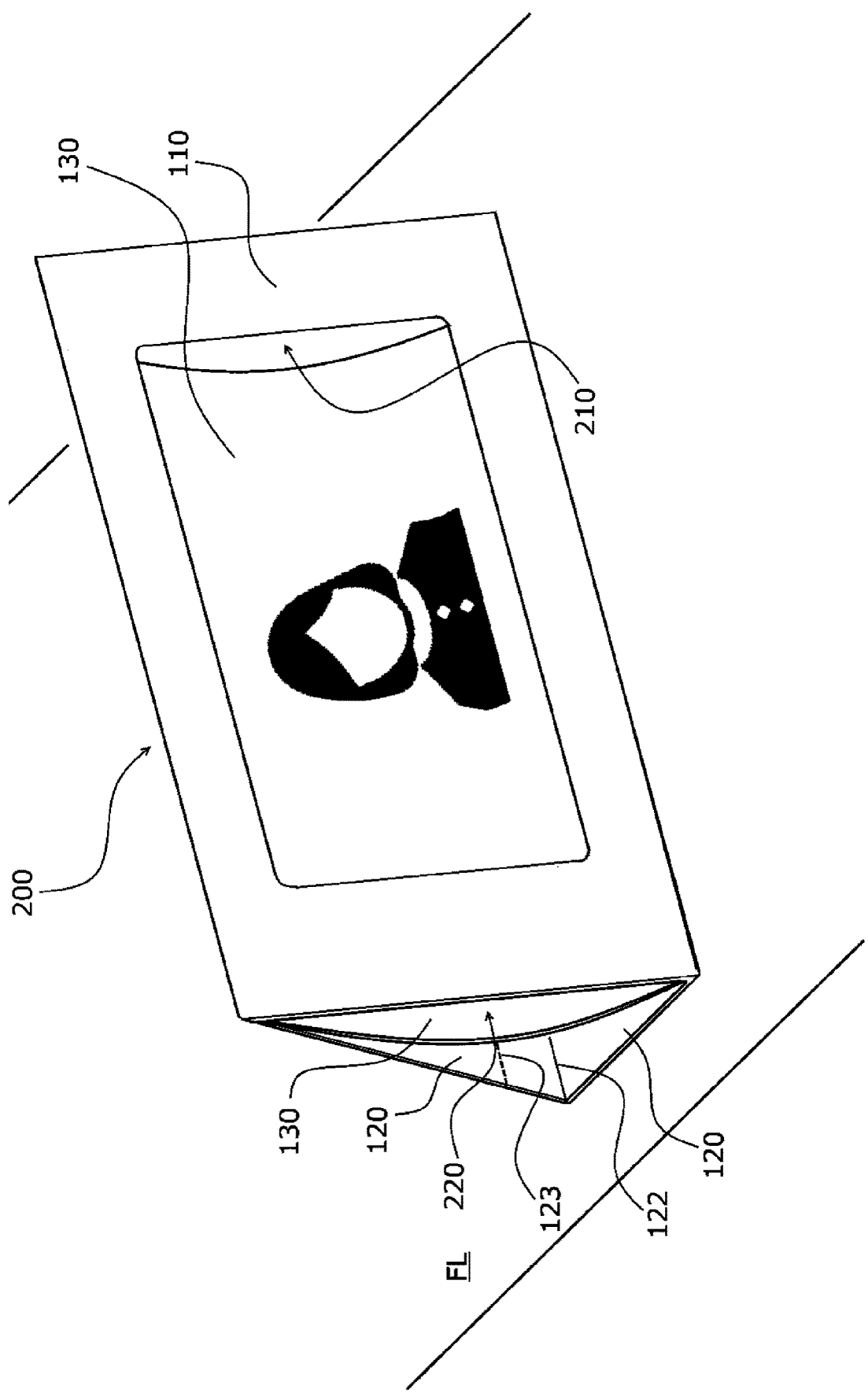
FIG. 5 is a perspective view of a photo stand in a landscape orientation.

When the photo stand sheet body 100 is folded into a photo stand, the first folding portion 113 forms a first plane that allows the window part 111 to stand substantially perpendicularly to the ground FL (see FIG. 5).

Figure 6:
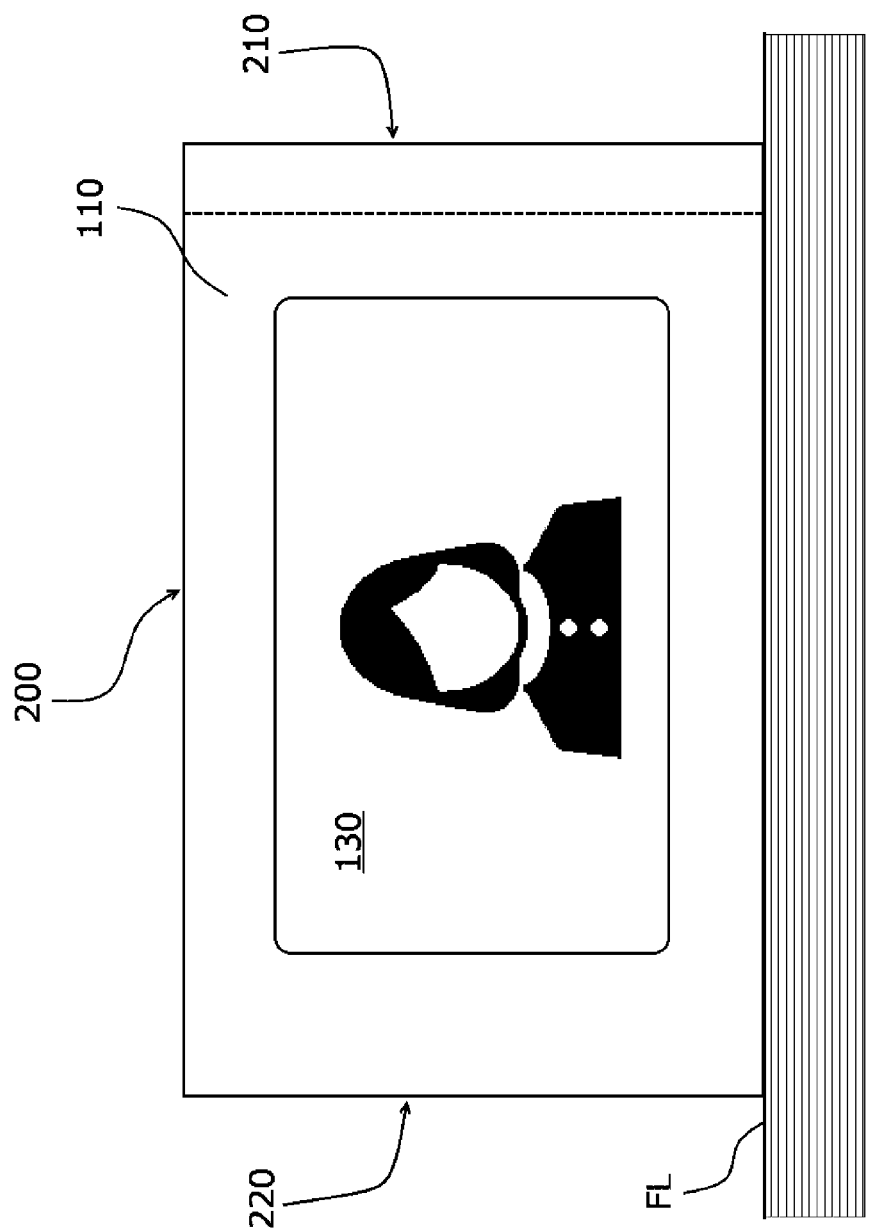
FIG. 6 is a front view of the photo stand in the landscape orientation.

Furthermore, when the photo stand sheet body 100 is folded into a photo stand, the second folding portion 122 forms a second plane that allows the window part 111 to stand so as to be tilted upward with respect to the ground FL (see FIG. 6).

When the photo stand sheet body 100 is folded into a photo stand, the third folding portion 123 and the fourth folding portion 124 are peak-folded such that the photo part 130 is located inside the frame part 110.

As shown in FIG. 2, the frame part 110 and the photo part 130 have a first projection 116 and a second projection 135, respectively, extending in the first direction. The amount of projection C by which the first projection 116 of the frame part 110 projects is larger than the amount of projection D by which the second projection 135 of the photo part 130 projects (C>D). With this configuration, when the photo stand sheet body 100 is formed into a photo stand and is allowed to stand in a free-standing manner on the ground FL (see FIG. 12) such that the first projection 116 is in contact with the ground FL, the photo part 130 is in the portrait orientation and is tilted upward in a state in which the second projection 135 overlaps the first projection 116 to reinforce the first projection 116 from the rear side.

By changing the amount of projection C by which the first projection 116 projects, the tilt angle of the photo part 130 can be changed.

Figure 13:
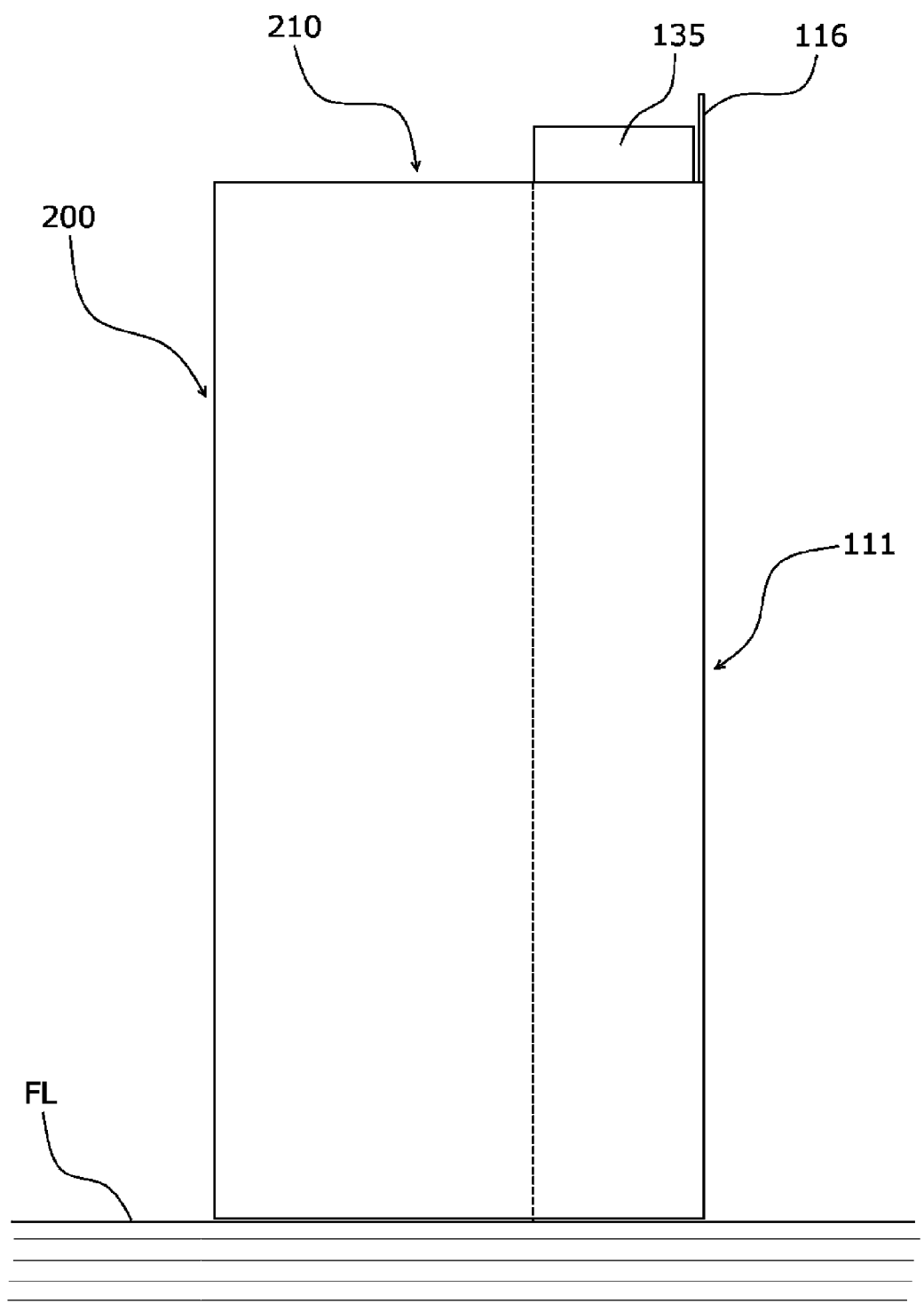
FIG. 13 is a side view of the photo stand to be viewed in a vertical orientation in which the window part stands substantially vertically.

When the photo stand is allowed to stand in a free-standing manner such that the side having no first projection 116 or second projection 135 is grounded, the photo part 130 is in the portrait orientation and extends vertically (see FIG. 13).

Modification

Figure 4:
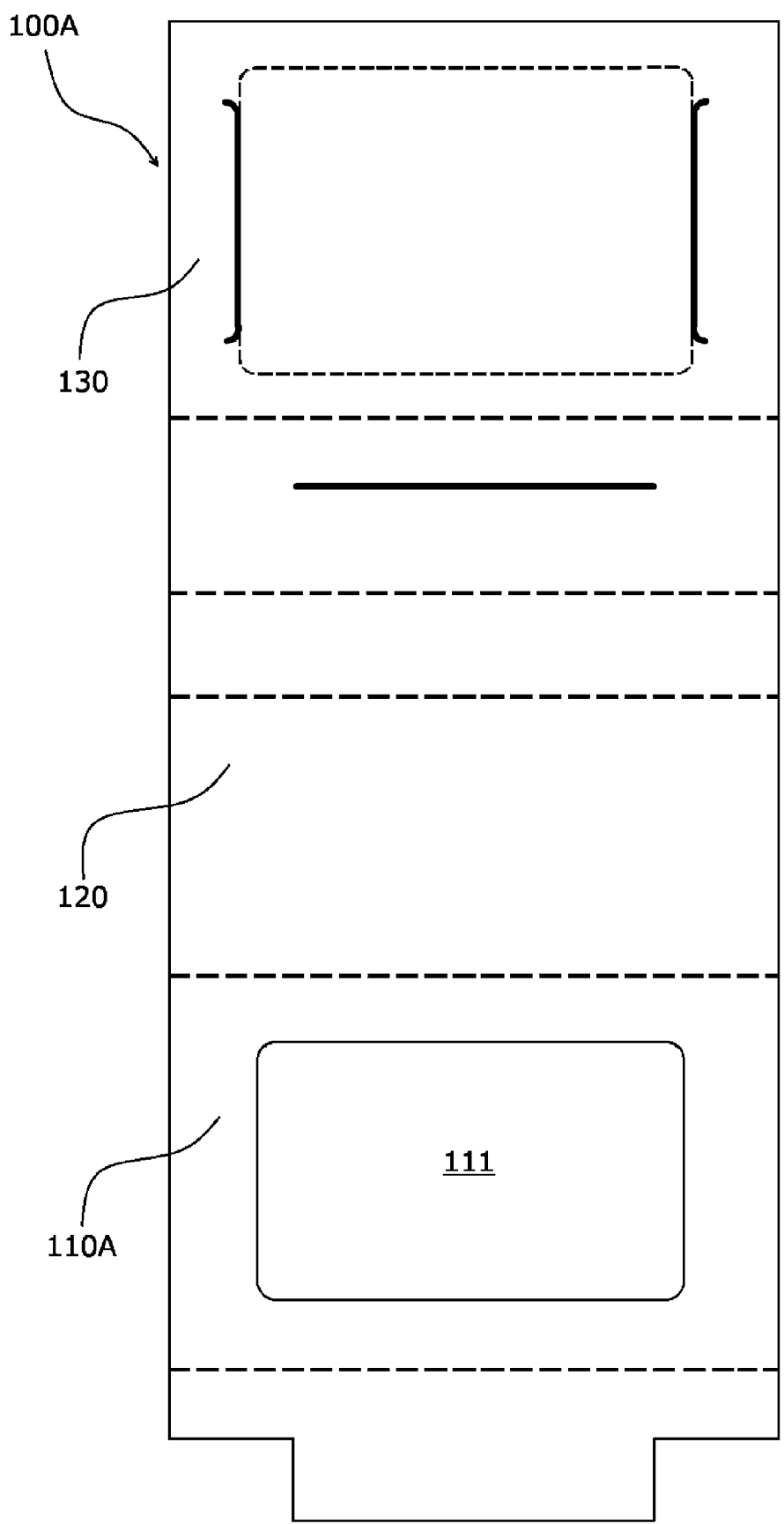
FIG. 4 shows a photo stand sheet body according to a modification.

FIG. 4 shows a photo stand sheet body 100A according to a modification.

In the photo stand sheet body 100A, a frame part 110A and a photo part 130A do not have projections projecting in the first direction. Hence, when the photo stand sheet body 100A is formed into a photo stand and is allowed to stand in a free-standing manner such that the opening defined by the edges of the frame part 110A, the stand part 120, and the photo part 130A is in contact with the ground FL, the photo part 130 is in the portrait orientation and extends vertically.

As shown in FIG. 2, the photo part 130 has a perforated tear-off line 131 penetrating through the photo stand sheet body 100 along the photo area. This allows an image printed at the photo part 130 to be separated as an independent photo from the photo stand.

The photo part 130 also has slits 132 penetrating through the photo stand sheet body 100 at both ends thereof. This makes it possible to view a printed photo fitted into the slits 132, without needing to print an image at the photo part 130.

(2) Photo Stand

Figure 7:
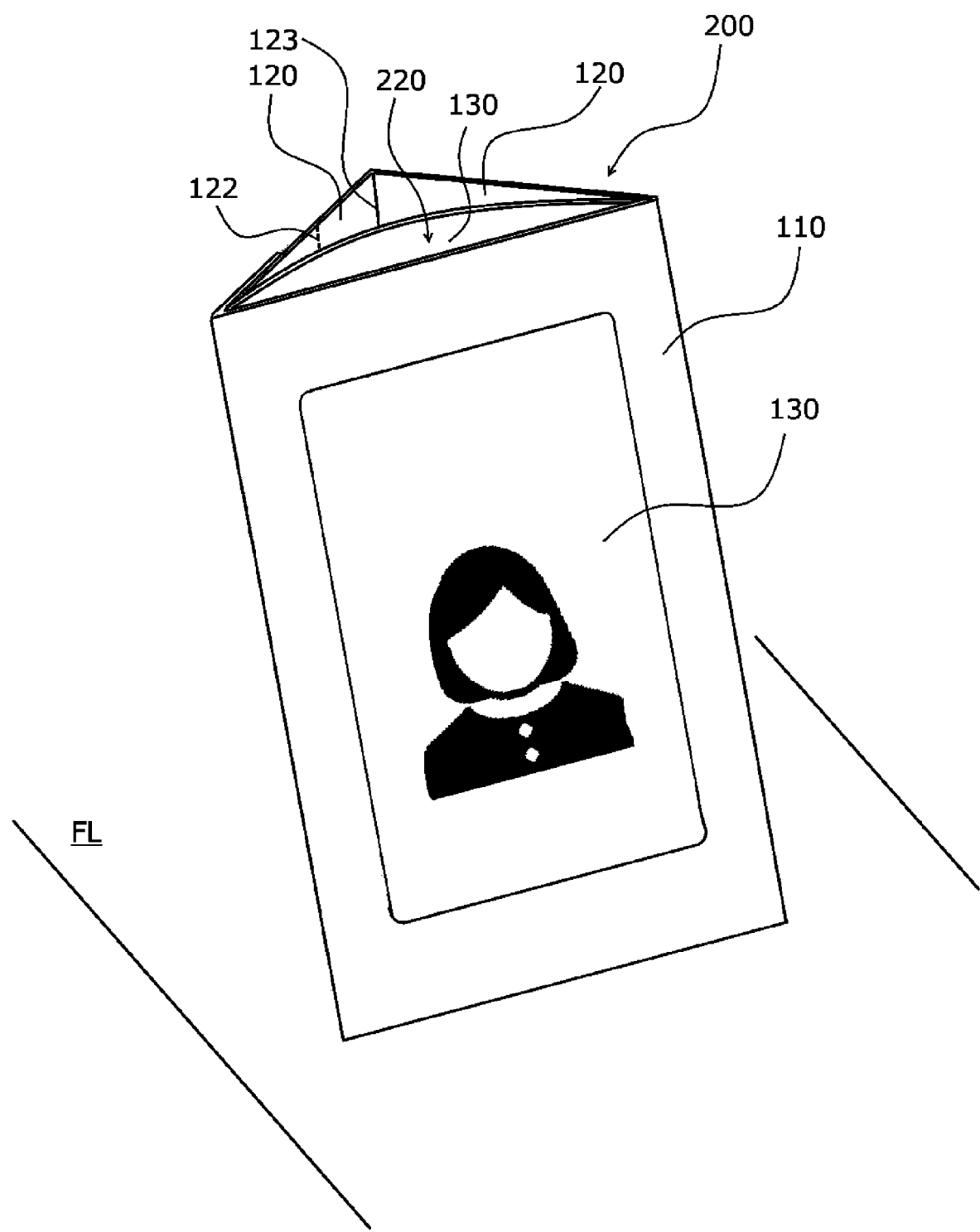
FIG. 7 is a perspective view of the photo stand in a portrait orientation.
Figure 8:
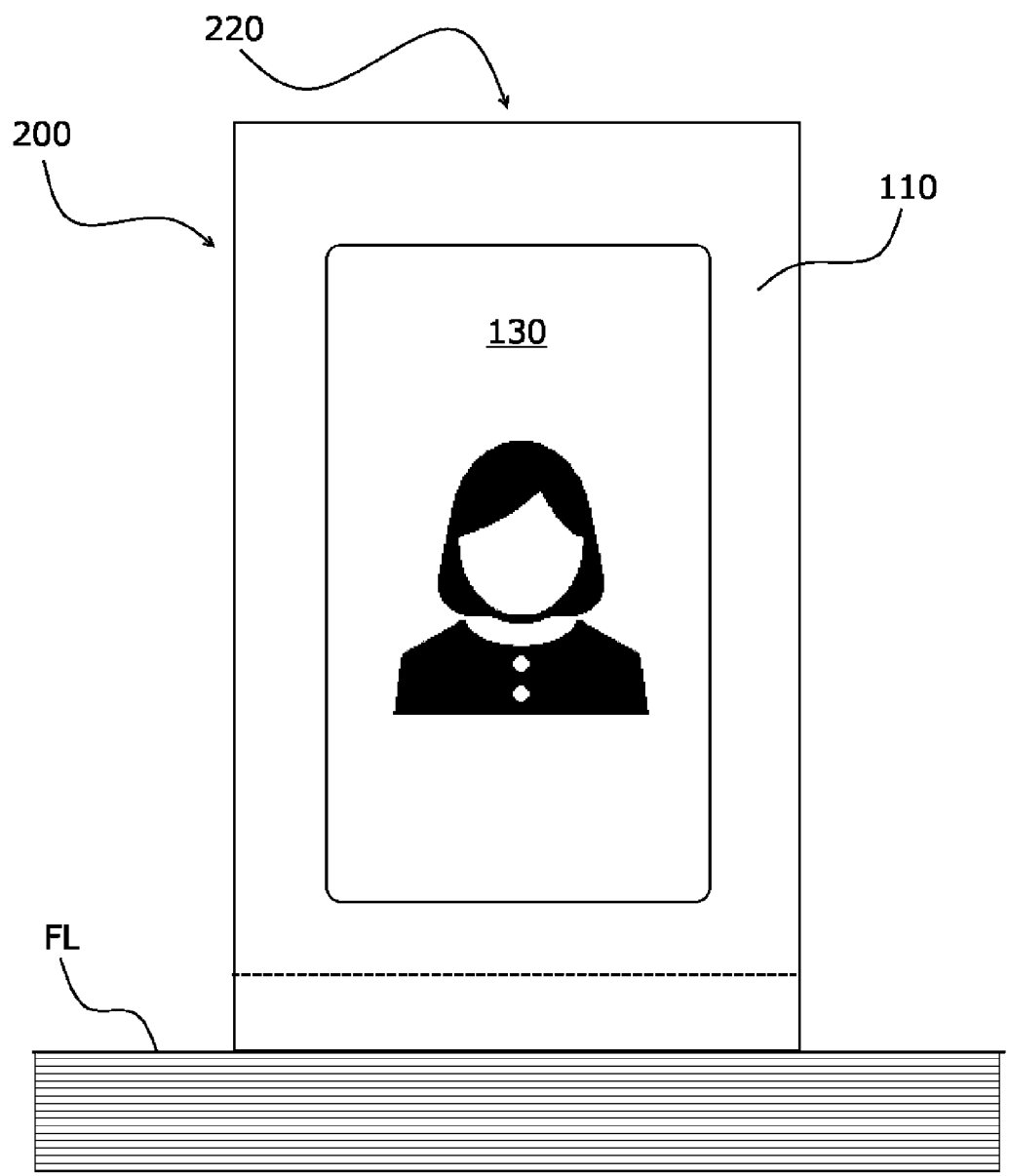
FIG. 8 is a front view of the photo stand in the portrait orientation.
Figure 9:
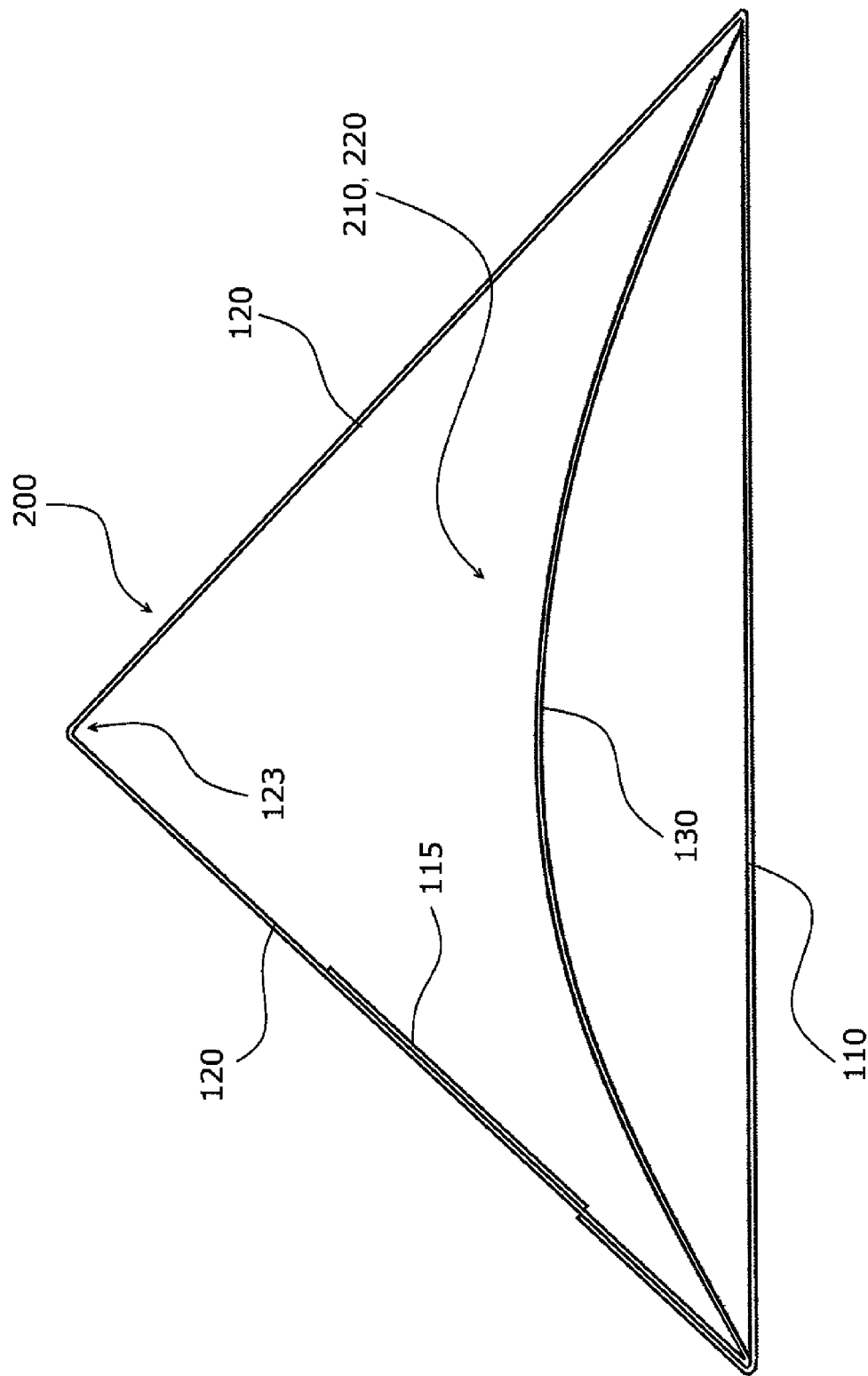
FIG. 9 is a top view of the photo stand in the portrait orientation.

FIG. 5 is a perspective view of a photo stand 200 in the landscape orientation, FIG. 6 is a front view of the photo stand 200 in the landscape orientation, FIG. 7 is a perspective view of the photo stand 200 in the portrait orientation, FIG. 8 is a front view of the photo stand 200 in the portrait orientation, and FIG. 9 is a top view of the photo stand 200 in the portrait orientation.

The photo stand sheet body 100 including the frame part 110, the stand part 120, and the photo part 130 are peak-folded along the first folding portion 113, the fourth folding portion 124, the fifth folding portion 125, and the second folding portion 122 or the third folding portion 123, and the insertion portion 115 formed at the frame part 110 is inserted into the slit 121 provided in the stand part 120. Thus, the photo stand 200 that can stand in a free-standing manner on the ground is formed without needing to use an adhesive or the like.

In the photo stand 200 formed by folding the photo stand sheet body 100 at the respective folding portions, the photo part 130 is curved in a concave shape with respect to the window part 111 in the frame part 110. Thus, it is possible to view the photo stereoscopically and to improve the appearance of the photo.

The photo stand 200 has a triangular prism shape. The areas corresponding to the top surface and the bottom surface of the triangular prism are a first opening 210 and a second opening 220, via which the photo part 130 communicates with the outside.

More specifically, the first opening 210 is defined by: a base of the frame part 110, serving as a first plane, having the first projection 116; and two or more bases of the stand part 120, serving as a second plane, that is bent at the second folding portion 122 or the third folding portion 123.

The second opening 220 is defined by the base of the frame part 110 having no first projection 116 and the base of the stand part 120 that is bent at the second folding portion 122 or the third folding portion 123.

When the photo part 130 shows a landscape-orientation image to be viewed in a horizontal orientation (see FIGS. 5 and 6), the first opening 210 and the second opening 220 are located at both sides of the frame part 110, whereas when the photo part 130 shows a portrait-orientation image to be viewed in a vertical orientation (see FIGS. 7 and 8), the first opening 210 and the second opening 220 are formed at the top and bottom of the frame part 110, as shown in FIG. 9. Thus, when the photo stand 200 stands in a free-standing manner on the ground FL, light easily enters the photo part 130 from the outside, making the photo look bright.

Figure 10:
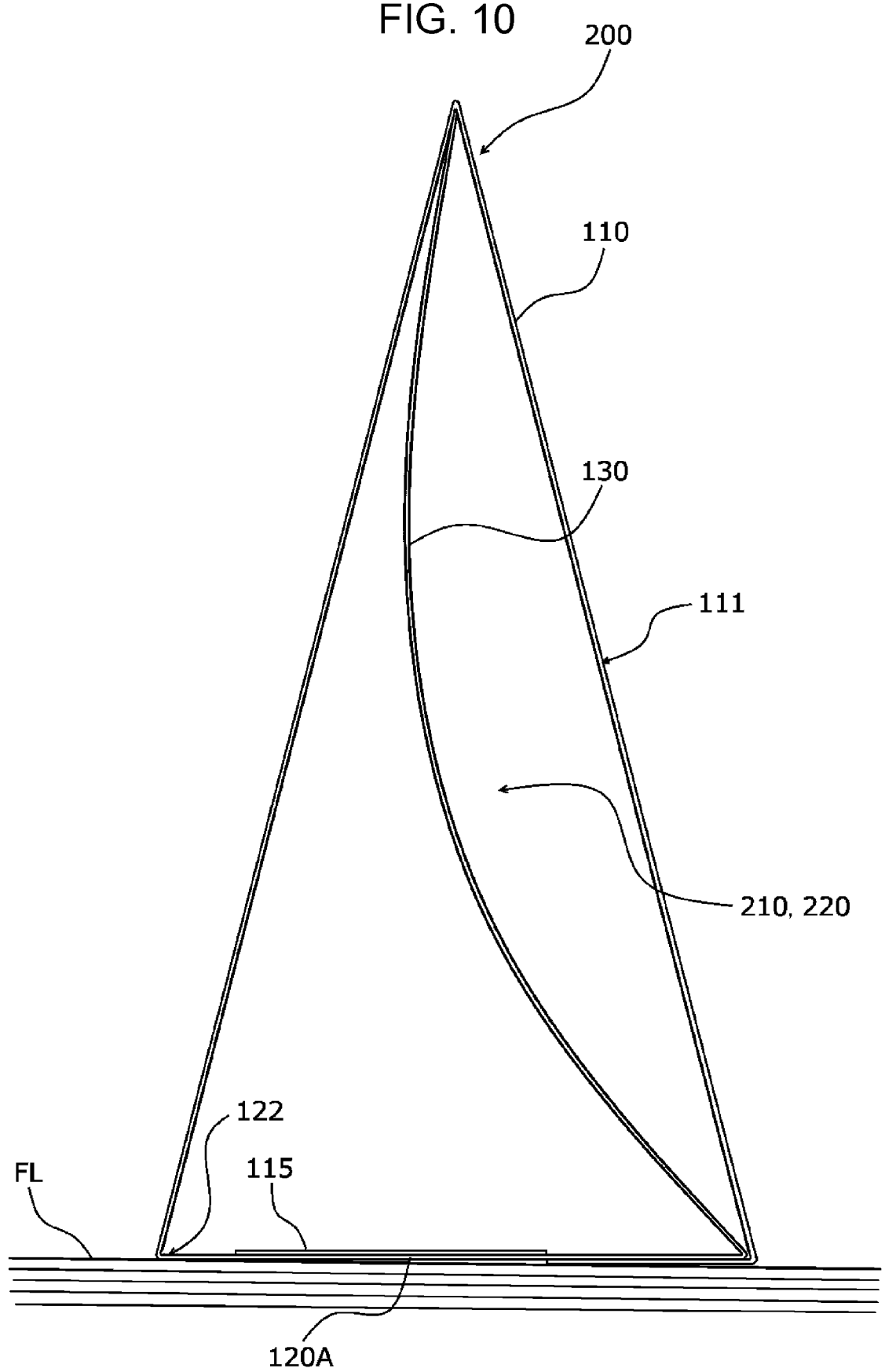
FIG. 10 is a side view of the photo stand to be viewed in a horizontal orientation in which the window part stands substantially vertically.
Figure 11:
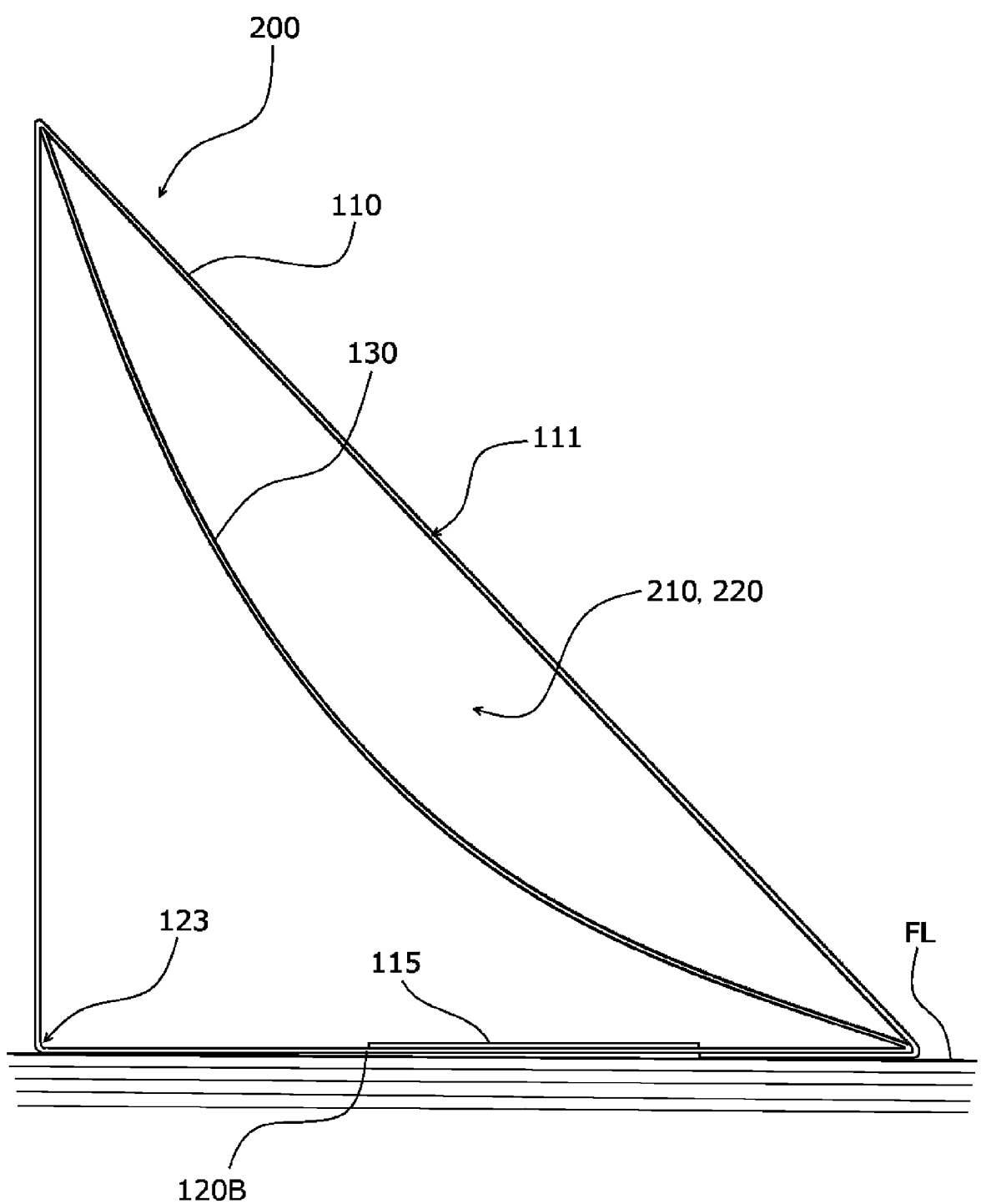
FIG. 11 is a side view of the photo stand to be viewed in a horizontal orientation in which the window part stands so as to be tilted upward.

FIG. 10 is a side view of the photo stand to be viewed in a horizontal orientation in which the window part 111 stands substantially vertically. FIG. 11 is a side view of the photo stand to be viewed in a horizontal orientation in which the window part 111 stands so as to be tilted upward.

As shown in FIG. 10, when the photo stand sheet body 100 is folded along the second folding portion 122 in the stand part 120, a first grounding portion 120A defined by the second folding portion 122 and the fifth folding portion 125 in the stand part 120 comes into contact with the ground FL, allowing the window part 111 to stand substantially vertically.

Furthermore, as shown in FIG. 11, when the third folding portion 123 in the stand part 120 is folded, a second grounding portion 120B defined by the third folding portion 123 and the fifth folding portion 125 in the stand part 120 comes into contact with the ground FL, allowing the window part 111 to stand so as to be tilted upward.

This way, in the photo stand 200, the viewing angle of the landscape-orientation photo can be changed by changing the folding portion to be folded between the second folding portion 122 and the third folding portion 123 in the stand part 120.

Figure 12:
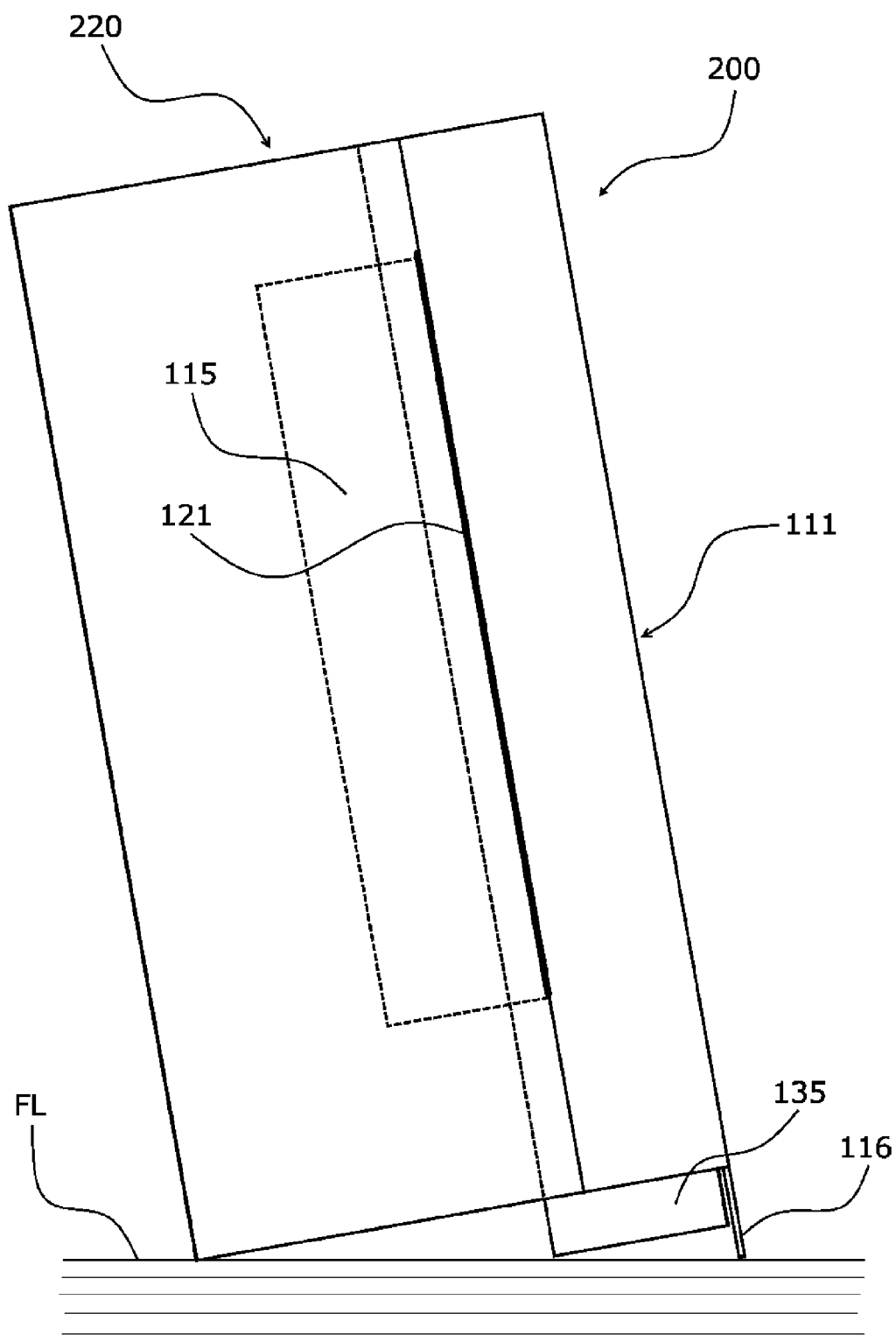
FIG. 12 is a side view of the photo stand to be viewed in a vertical orientation in which the window part stands so as to be tilted upward.

FIG. 12 is a side view of the photo stand to be viewed in a vertical orientation in which the window part 111 stands so as to be tilted upward. FIG. 13 is a side view of the photo stand to be viewed in a vertical orientation in which the window part 111 stands substantially vertically.

In the photo stand 200, when a photo is viewed in a vertical orientation, the viewing angle of the photo can be changed by changing between: a first mode, as shown in FIG. 12, in which the end having the first opening 210 is in contact with the ground FL, allowing the window part 111 to stand so as to be tilted upward; and a second mode, as shown in FIG. 13, in which the end having the second opening 220 is in contact with the ground FL, allowing the window part 111 to stand substantially vertically.

(3) Image Printing on Photo Stand Sheet

Figure 14:
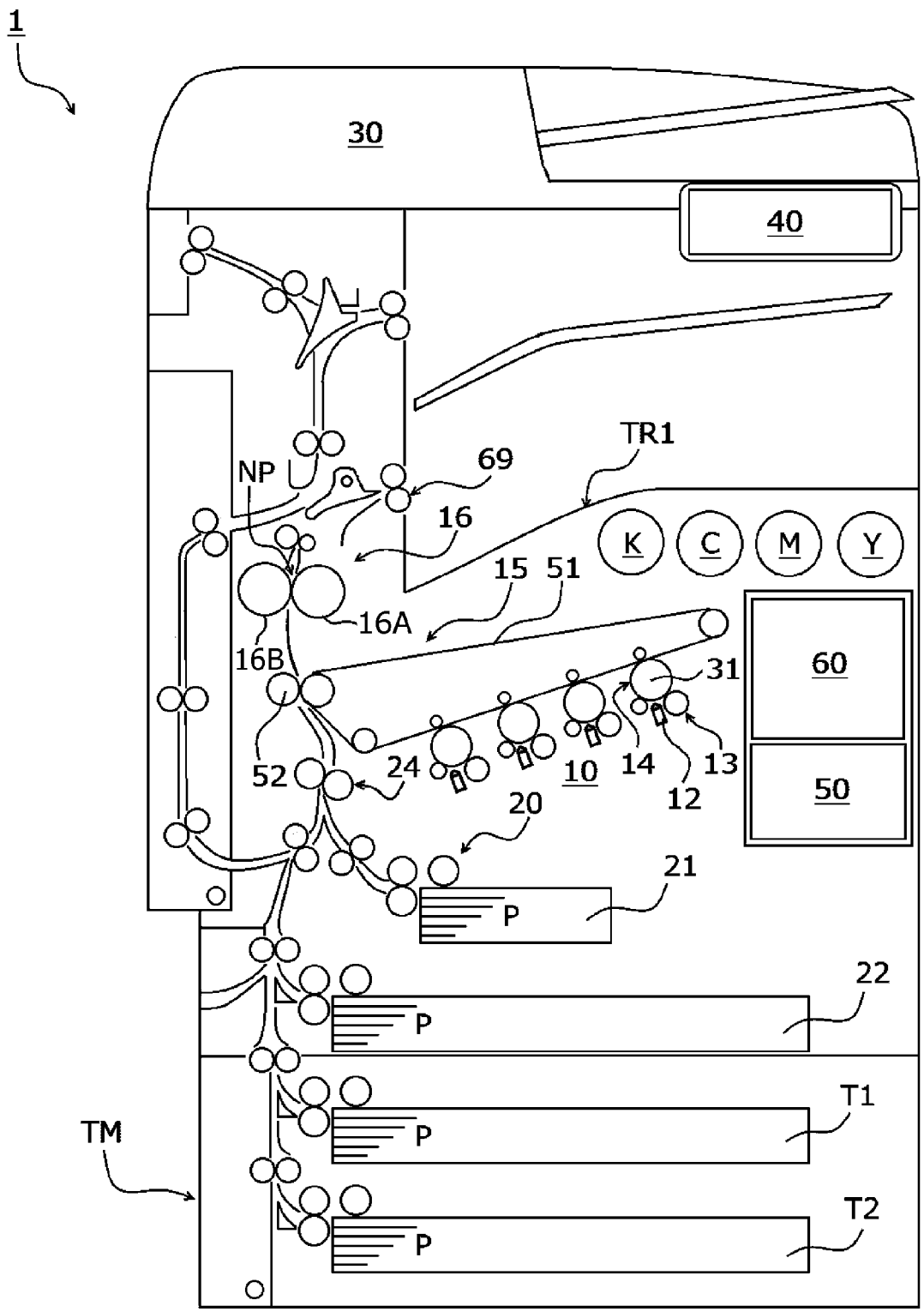
FIG. 14 is a schematic sectional view showing the internal configuration of a printer according to an exemplary embodiment.
Figure 15:
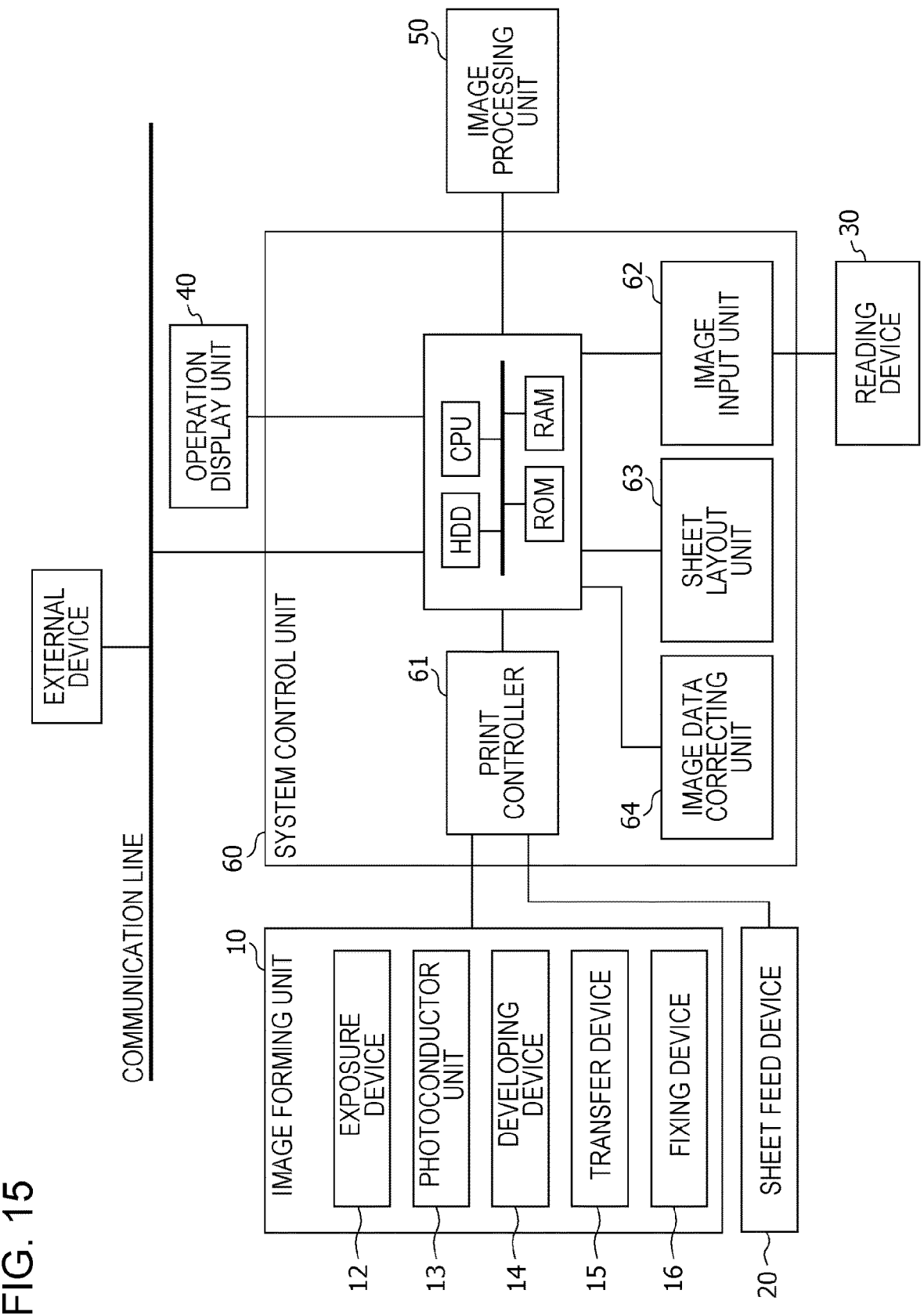
FIG. 15 is a block diagram showing the functional configuration of the printer.

FIG. 14 is a schematic sectional view showing the internal configuration of a printer 1 that lays out an image and prints the image on the photo part of the photo stand sheet according to this exemplary embodiment, and FIG. 15 is a block diagram showing the functional configuration of the printer 1.

Referring to the drawings, the overall configuration and operation of the printer 1 will be described.

(3.1) Overall Configuration of Image Forming Apparatus

The printer 1 includes an image forming unit 10, a sheet feed device 20 provided below the image forming unit 10, a reading device 30 provided above the image forming unit 10, an operation display unit 40, an image processing unit 50, and a system control unit 60. The printer 1 has an image printing function in which a photo stand sheet PS is fed, and a captured image is laid out and is printed thereon.

The image forming unit 10 includes exposure devices 12, photoconductor units 13, developing devices 14, a transfer device 15, and a fixing device 16. The image forming unit 10 forms a toner image on a sheet fed by the sheet feed device 20 on the basis of image information received from the image processing unit 50.

The sheet feed device 20 including sheet trays 21 and 22 is provided below the image forming unit 10. A tray module TM including sheet trays T1 and T2, which are arranged in multiple stages (two stages in this exemplary embodiment) in the top-bottom direction and accommodate sheets P, is connected below the sheet feed device 20. The tray module TM feeds sheets to the image forming unit 10.

As shown in FIG. 14, the sheet tray (hereinbelow, a specific tray) 21 is arranged such that a transport path extending to the transfer device 15 in the image forming unit 10 is shorter than those of the other sheet trays 22, T1, and T2 and such that the curvature of the transport path is smaller than those of the other sheet trays 22, T1, and T2. The specific tray 21 accommodates photo stand sheets PS to be used for image printing, at the photo parts 130, on the photo stands according to this exemplary embodiment and feeds the photo stand sheets PS to the image forming unit 10.

The reading device 30 is provided above the image forming unit 10. The reading device 30 has an image sensor (not shown), such as a charge coupled device (CCD) line sensor. The reading device 30 reads the image on a document loaded on a document bed and converts the image into image data, which is an electric signal.

The operation display unit 40, serving as a user interface, is provided on the front side of the reading device 30. The operation display unit 40 is a combination of a liquid crystal display panel, operation buttons, a touch panel, and the like. A user of the printer 1 inputs various settings and instructions through the operation display unit 40. Various information for the user of the printer 1 is displayed on the liquid crystal display panel.

The image processing unit 50 generates image data from a print information captured from an external device, such as a digital camera, a portable terminal, or a personal computer and performs various image processing using the image data input from the reading device 30.

(3.2) Configuration and Operation of Image Forming Unit 10

In the thus-configured printer 1, the sheet feed device 20 feeds a sheet specified in a print job to the image forming unit 10 in accordance with the timing of image formation.

The photoconductor units 13 are arranged side-by-side above the sheet feed device 20 and each include a drivingly rotating photoconductor drum 31. The exposure devices 12 form electrostatic latent images on the photoconductor drums 31, and the developing devices 14 form yellow (Y), magenta (M), cyan (C), and black (K) toner images on the corresponding photoconductor drums 31.

The color toner images formed on the photoconductor drums 31 of the photoconductor units 13 are sequentially and electrostatically transferred (first transferred) to an intermediate transfer belt 51 of the transfer device 15, forming superimposed toner images in which the color toner images are superimposed on one another. The superimposed toner images on the intermediate transfer belt 51 are simultaneously transferred, by a second transfer roller 52, to the sheet P fed by a registration roller pair 24 and guided by a transport guide.

In the fixing device 16, a heating module 16A and a pressing module 16B, forming a pair, are pressed against each other, forming a fixing nip part NP (fixing area).

The sheet P, on which the toner images are simultaneously transferred in the transfer device 15, is transported to the fixing nip part NP of the fixing device 16 via the transport guide with the toner images being unfixed. The heating module 16A and the pressing module 16B apply heat and pressure, thus fixing the toner images.

The sheet P, on which the toner images are fixed, is guided by the transport guide and is discharged on a paper output tray TR1 provided on the top surface of the printer 1 by a discharging roller pair 69.

When duplex printing is automatically performed, the sheet P is revered and is sent to the image forming unit 10 again. Then, after toner images are transferred and fixed, the sheet P is discharged on the paper output tray TR1.

(3.3) Functional Configuration and Operation of System Control Unit

The printer 1 includes the system control unit 60 including a print controller 61, an image input unit 62, a sheet layout unit 63, and an image data correcting unit 64. The system control unit 60 executes a control program stored in the memory to control the overall operation of the printer 1.

The print controller 61 exchanges information with the sheet feed device 20 and issues operation control instructions to the exposure devices 12, the photoconductor units 13, the developing devices 14, the transfer device 15, the fixing device 16, and the like of the image forming unit 10.

The image input unit 62 exchanges information with an external device. More specifically, when an image acquisition instruction is received via the operation display unit 40, the image input unit 62 captures image data from the external device connected to the printer 1.

The sheet layout unit 63 lays out the image data input by the image input unit 62 on the photo part 130 of a specified photo stand sheet PS. For example, when an instruction of photo printing on a photo stand sheet PS is input via the operation display unit 40, the sheet layout unit 63 determines how to arrange the image, i.e., arranges the captured image data on the photo part 130 of the specified photo stand sheet PS as a landscape-orientation image or a portrait-orientation image.

When no-margin printing is instructed via the operation display unit 40, if the image in a certain area in the edges of the captured image is not blank, the image data correcting unit 64 performs correction on the edges such that the image data in the certain area of the edges is enlarged. More specifically, when the image in the certain area of the edges of the captured image is a certain uniform image, the image data correcting unit 64 performs correction on the edges such that the image data in the certain area of the edges is enlarged.

(3.4) Photo Printing

Figure 16:
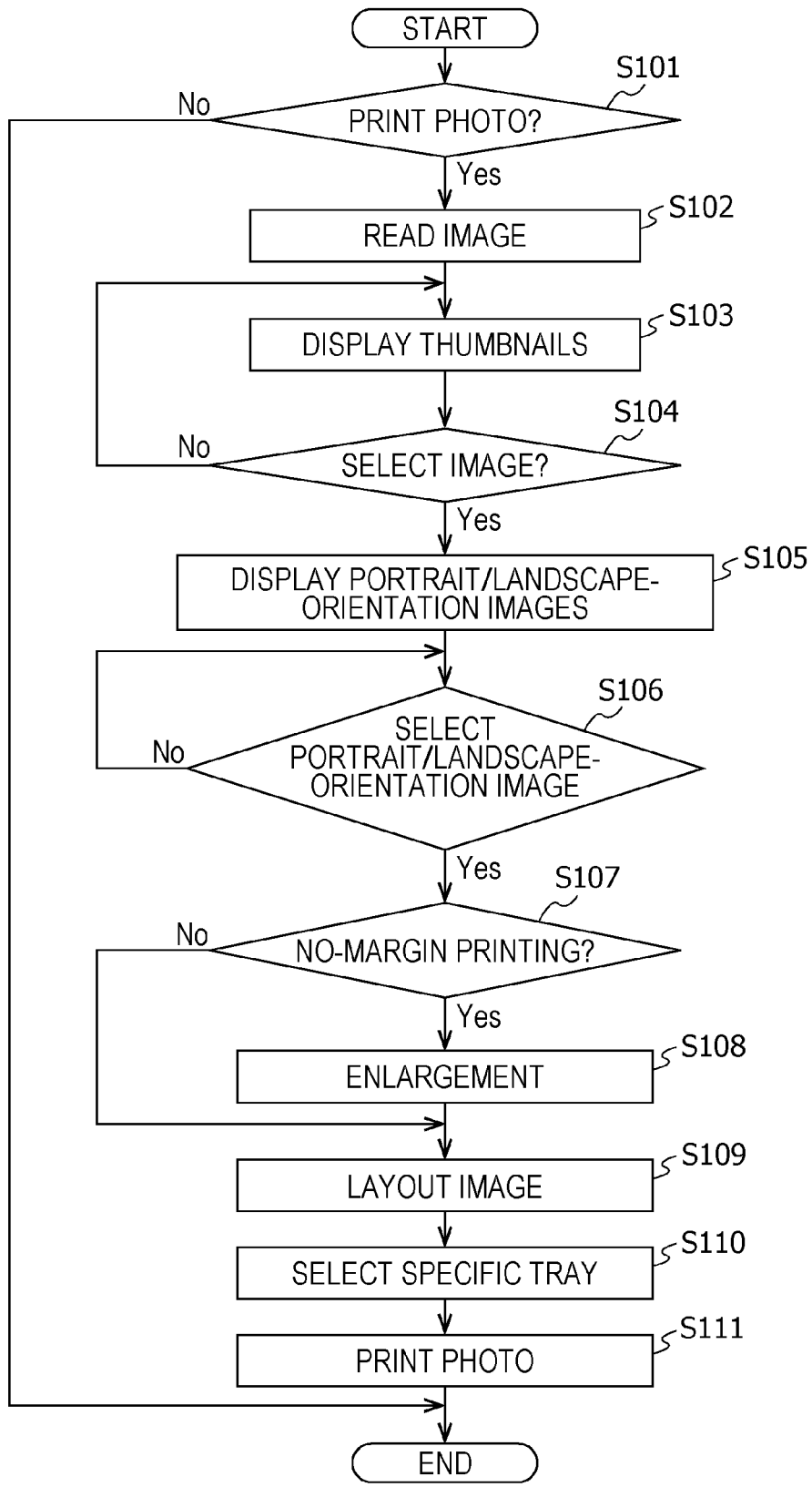
FIG. 16 is a flowchart showing a flow of a photo printing operation performed by the printer.
Figure 17:
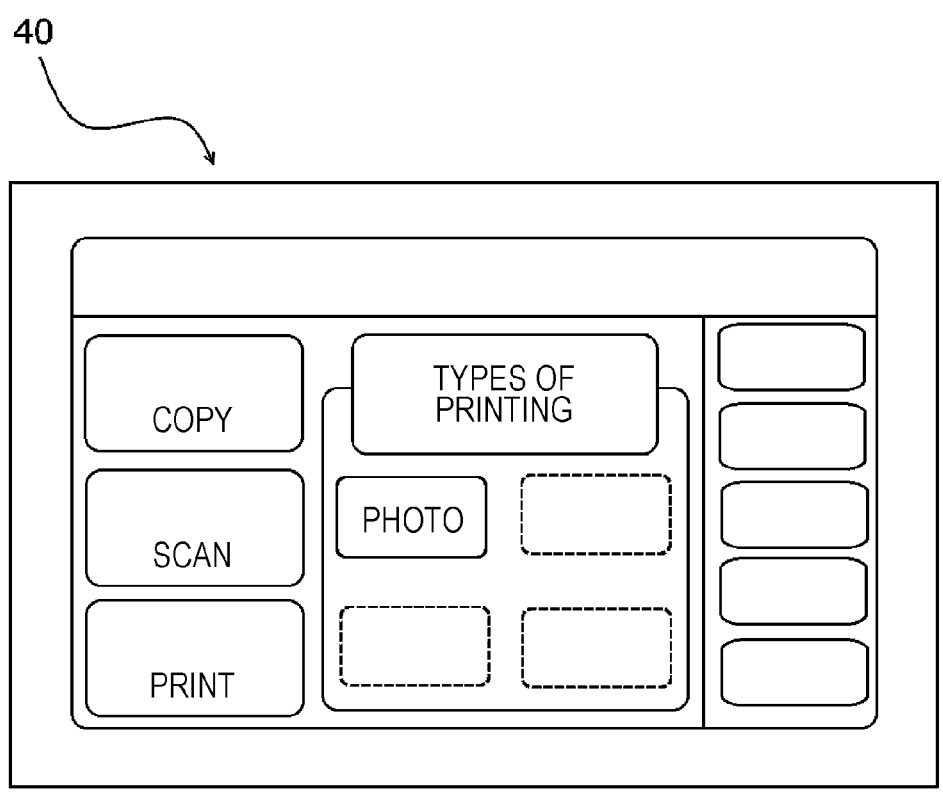
FIG. 17 shows an example screen displayed on an operation display unit when photo printing is performed.
Figure 18A:
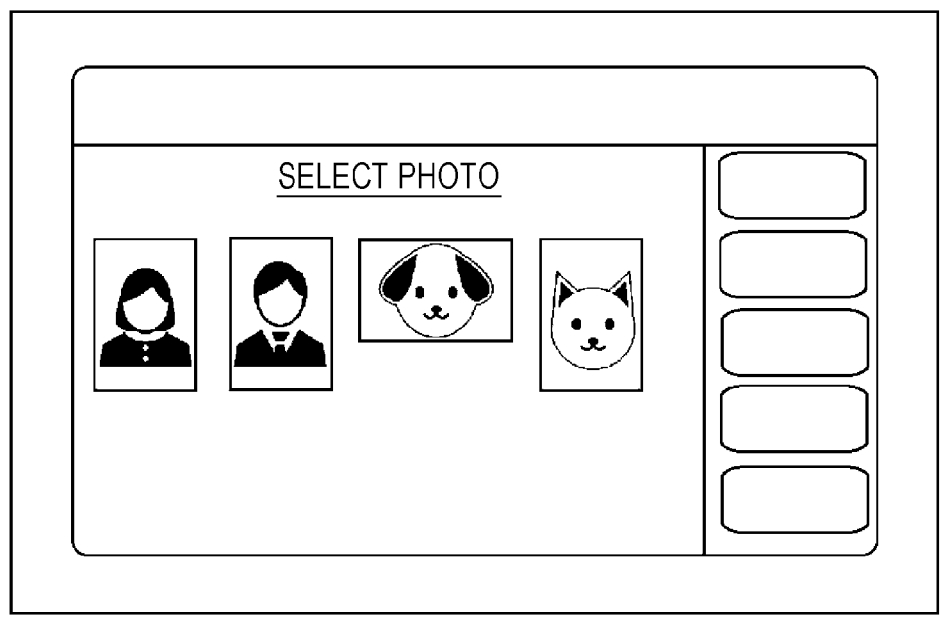
FIGS. 18A and 18B show example screens displayed on the operation display unit according to the flow of operation when photo printing is performed.
Figure 18B:
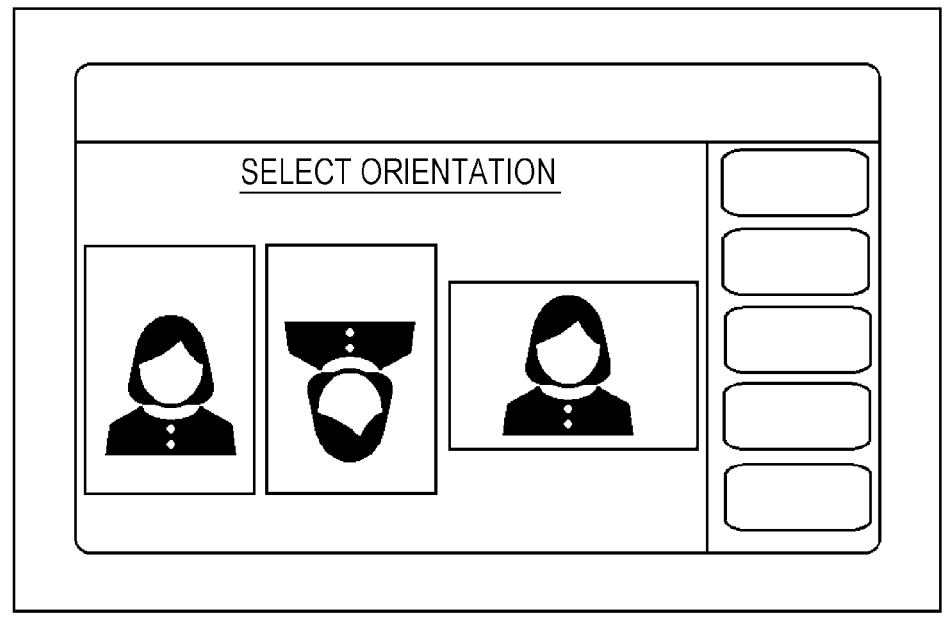

FIG. 16 is a flowchart showing a flow of a photo printing operation performed by the printer 1, FIG. 17 shows an example screen displayed on the operation display unit 40 when photo printing is performed, FIGS. 18A and 18B show example screens displayed on the operation display unit 40 according to the flow of operation when photo printing is performed, and FIG. 19 shows a layout of the captured image data on the photo stand sheet PS.

Photo printing performed by the printer 1 will be described below with reference to the drawings.

As shown in FIG. 17, in the printer 1, the operation display unit 40 displays a print selection screen via which various printing instructions including normal image copying, printing, and scanning, are received. A user can select photo printing via the operation display unit 40 when photo printing is performed.

When a photo printing instruction is received (S101: Yes), the image input unit 62 reads image data from the external device (S102), and, as shown in FIG. 18A, thumbnails of photos to be potentially printed are displayed on the operation display unit 40 (S103).

When a specific image is selected from the thumbnails (S104: Yes), the selected image is displayed in the landscape orientation and two types of portrait orientations (S105), as shown in FIG. 18B.

One of the landscape-orientation image and two types of portrait-orientation images is selected (S106: Yes), and it is determined whether or not no-margin printing is instructed (S107). When no-margin printing is instructed (S107: Yes), the image data is enlarged (S108), and, as shown as an example in FIG. 19, the image is arranged on the photo part 130 of a photo stand sheet PS to be printed, in the instructed orientation (S109).

Then, the specific tray 21 accommodating the photo stand sheet PS is selected (S110), and photo printing is performed (S111).

With this configuration, it is possible to print one of the landscape-orientation photo and two types of portrait-orientation photos on the photo part 130 according to the way the photo stand is viewed.

In this exemplary embodiment, although a color image forming apparatus having an image forming function has been described as the printer 1, the printer 1 may be a portable terminal or a personal computer to which a color printer is connected.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A photo stand sheet, the length of the photo stand sheet in a first direction being smaller than that in a second direction perpendicular to the first direction, the photo stand sheet comprising:
   a frame part having a window part, the frame part having a rectangular shape in which the length in the first direction is larger than that in the second direction;
   a stand part that is formed so as to be continuous with the frame part and that stands on a ground after the photo stand sheet is formed into a final shape;
   a photo part that is formed so as to be continuous with the stand part, a dimension thereof in the second direction being larger than a dimension of the frame part in the second direction;
   a first folding portion that is provided in the stand part, at a position closer to the photo part than to the frame part; and
   a second folding portion that is provided at a position substantially the same distance from the frame part and the photo part.

2. The photo stand sheet according to claim 1, wherein a relationship 1.01<A/B<1.2 is satisfied where the dimension of the photo part in the second direction is A, and the dimension of the frame part in the second direction is B.

3. The photo stand sheet according to claim 2, wherein the first folding portion forms a first plane that allows the window part to stand substantially vertically with respect to the ground after the first folding portion is folded, and the photo stand sheet is formed into a final shape, and
   the second folding portion forms a second plane that allows the window part to stand so as to be tilted upward with respect to the ground after the second folding portion is folded, and the photo stand sheet is formed into the final shape.

4. The photo stand sheet according to claim 1, wherein the photo stand sheet is a bonded sheet in which a front sheet and a back sheet are stacked on one another with an adhesive layer therebetween, the photo stand sheet having a slit provided by cutting halfway therethrough from the front side and the rear side and a plurality of folding portions provided by cutting halfway therethrough from the rear side such that the photo stand sheet can be folded therealong.

5. The photo stand sheet according to claim 4, wherein the slit forms the window part.

6. The photo stand sheet according to claim 4, wherein the photo stand sheet has the slit in the stand part, at a position closer to the photo part than to the frame part, and an insertion portion to be inserted into the slit when the photo stand sheet is formed into a final shape, the insertion portion being formed on the side of the frame part opposite from the stand part.

7. The photo stand sheet according to claim 1, wherein the photo stand sheet has a penetrating perforated tear-off line along which a part of the photo stand sheet can be separated.

8. The photo stand sheet according to claim 7, wherein the photo part has the perforated tear-off line along the area of a photo to be printed.

9. The photo stand sheet according to claim 7, wherein both ends of the photo part has slits.

10. A photo stand comprising:
    a frame part having a window part;
    a photo part that is held in a concave shape with respect to the window part after the photo stand is formed into a final shape; and
    a stand part that allows the photo stand to stand in a free-standing manner with respect to a ground after the photo stand is formed into the final shape,
    wherein the photo stand is formed of the foldable photo stand sheet according to claim 1.

11. The photo stand according to claim 10, wherein the frame part has openings through which the photo part communicates with the outside.

12. The photo stand according to claim 11, wherein
    the openings are provided at the top and bottom of the frame part in the case where the photo part displays a portrait-orientation image to be viewed in a vertical orientation, and
    the openings are provided at both sides of the frame part in the case where the photo part displays a landscape-orientation image to be viewed in a horizontal orientation.

13. The photo stand according to claim 11, wherein the openings include: a first opening that is defined by a first plane having the window part and having a projection at one end and two or more second planes intersecting the first plane, the first opening allowing the window part to stand so as to be tilted upward with respect to the ground in a state in which a base of the first plane having the projection and bases of the second plane are grounded; and a second opening that allows the window part to stand substantially perpendicularly to the ground in a state in which a base of the first plane having no projection and other bases of the second planes are grounded.

14. The photo stand according to claim 10, wherein the stand part includes a first plane that allows the window part to stand substantially perpendicularly to the ground or a second plane that allows the window part to stand so as to be tilted upward with respect to the ground.

15. A printer that lays out an image on the photo part of the photo stand sheet according to claim 1, the printer comprising:

a storage unit that stores photo information including a photo to be used and the orientation in which the image is arranged at the photo part; and a layout unit that is operated by an operator to select specified photo information from the storage unit and lays out the photo on the photo part on the basis of the selected photo information, wherein the layout unit lays out, upon receipt of an instruction from the operator, the image on the photo part as a landscape-orientation image to be viewed in a horizontal orientation, a first portrait-orientation image to be viewed in a vertical orientation in which the window part extends substantially perpendicularly to the ground, or a second portrait-orientation image to be viewed in a vertical orientation in which the window part stands so as to be tilted upward with respect to the ground.

16. The printer according to claim 15, further comprising:

a feeding unit that feeds a bonded sheet in which the photo stand sheet is arranged in a separable manner; and an image forming unit that prints an image on the photo part.

\* \* \* \* \*